US012643965B2

(12) United States Patent
Couffin et al.

(10) Patent No.: US 12,643,965 B2
(45) Date of Patent: Jun. 2, 2026

(54) COMPOSITION COMPRISING A MULTISTAGE POLYMER AND A (METH)ACRYLIC POLYMER, ITS METHOD OF PREPARATION AND ITS USE

(71) Applicant: Arkema France, Colombes (FR)

(72) Inventors: Aline Couffin, Lacq (FR); Philippe Hajji, Pierre-Benite Cedex (FR); Alexandre Vermogen, Pierre-Benite Cedex (FR); Elisabeth Bay, Lacq (FR); Jean-Claude Saint-Martin, Lacq (FR); Vinciane Chartois, Pierre-Benite Cedex (FR)

(73) Assignee: ARKEMA FRANCE, Puteaux (FR)

(*) Notice: Subject to any disclaimer, the term of this patent is extended or adjusted under 35 U.S.C. 154(b) by 1016 days.

(21) Appl. No.: 17/777,293

(22) PCT Filed: Nov. 30, 2020

(86) PCT No.: PCT/EP2020/083957

§ 371 (c)(1),
(2) Date: May 17, 2022

(87) PCT Pub. No.: WO2021/105508

PCT Pub. Date: Jun. 3, 2021

(65) Prior Publication Data

US 2022/0411544 A1 Dec. 29, 2022

(30) Foreign Application Priority Data

Nov. 29, 2019 (FR) ....................................... 1913528

(51) Int. Cl.

*C08F 36/06* (2006.01)
*C08F 2/22* (2006.01)
*C08F 20/06* (2006.01)

(52) U.S. Cl.

CPC ................ *C08F 36/06* (2013.01); *C08F 2/22* (2013.01); *C08F 20/06* (2013.01); *C08F 2500/18* (2013.01); *C08F 2500/24* (2013.01); *C08F 2500/32* (2021.01)

(58) Field of Classification Search

CPC .. C08F 36/06; C08F 2/22; C08F 20/06; C08F 2500/18; C08F 2500/24; C08F 2500/32; C08F 220/14; C08F 265/06; C08F 279/02; C08F 220/18; C08L 51/003; C08L 33/12; C08L 51/04

See application file for complete search history.

(56) References Cited

U.S. PATENT DOCUMENTS

| | | | |
|---|---|---|---|
| 4,463,131 | A | 7/1984 | Grandzol et al. |
| 4,620,874 | A | 11/1986 | Booth, Jr. et al. |
| 2004/0147668 | A1 | 7/2004 | Miyake et al. |
| 2007/0027233 | A1 | 2/2007 | Yamaguchi et al. |
| 2010/0099800 | A1 | 4/2010 | Ueno et al. |
| 2010/0270509 | A1 | 10/2010 | Sakuma et al. |
| 2017/0369696 | A1 | 12/2017 | Inoubli et al. |
| 2018/0002520 | A1 | 1/2018 | Inoubli et al. |
| 2019/0023890 | A1 | 1/2019 | Inoubli et al. |
| 2020/0172649 | A1 | 6/2020 | Hajji et al. |
| 2020/0172949 | A1 | 6/2020 | Tian et al. |

FOREIGN PATENT DOCUMENTS

| | | | | | |
|---|---|---|---|---|---|
| FR | 2934866 | A1 | | 2/2010 | |
| FR | 3053349 | A1 | | 1/2018 | |
| JP | 2005146139 | | * | 6/2005 | |
| WO | WO-2019011984 | A1 | * | 1/2019 | .............. C08L 63/00 |

* cited by examiner

*Primary Examiner* — K. Boyle
(74) *Attorney, Agent, or Firm* — Boone IP Law

(57) ABSTRACT

The present invention relates to a composition comprising a multistage polymer and a (meth)acrylic polymer in form of a porous polymer powder, its process of preparation and its use. The present invention also relates to a composition in form of a porous polymer powder comprising a multistage polymer in form of polymeric particles made by a multistage process and a (meth)acrylic polymer, while the (meth) acrylic polymer possesses a medium molecular weight. The present invention further relates to polymer composition in form of a porous polymer powder comprising polymeric particles made by a multistage process comprising at least two stages and a (meth)acrylic polymer, its process of preparation, its use and compositions and articles comprising it.

31 Claims, No Drawings

COMPOSITION COMPRISING A MULTISTAGE POLYMER AND A (METH)ACRYLIC POLYMER, ITS METHOD OF PREPARATION AND ITS USE

CROSS-REFERENCE TO RELATED APPLICATIONS

This application is a national stage application under 35 U.S.C. § 371 of PCT/EP2020/083957, filed Nov. 30, 2020 which claims benefit to application FR19.13528, filed Nov. 29, 2019.

FIELD OF THE INVENTION

The present invention relates to a composition comprising a multistage polymer and a (meth)acrylic polymer in form of a porous polymer powder, its process of preparation and its use.

In particular the present invention relates to a composition in form of a porous polymer powder comprising a multistage polymer in form of polymeric particles made by a multistage process and a (meth)acrylic polymer, while the (meth) acrylic polymer possesses a medium molecular weight.

More particularly the present invention relates to polymer composition in form of a porous polymer powder comprising polymeric particles made by a multistage process comprising at least two stages and a (meth)acrylic polymer, its process of preparation, its use and compositions and articles comprising it.

Technical Problem

Polymers are widely used also as additives in polymer compositions. These so called polymer additives are usually added as granulate or also as powder, either to solid polymers, or to molten polymers or to liquid resins or to liquid compositions.

One class of polymeric additives are processing aids, another one are polymeric impact modifiers.

Polymeric impact modifiers can be in form of polymeric particles. Usually these polymeric impact modifiers are in form of core-shell particles that are made by a multistage process, with at least one stage comprising a rubber like polymer. Afterwards these particles are incorporated in the polymers or polymer compositions, in order to increase their impact resistance. The polymers or polymer compositions can be thermoset ones or thermoplastic ones.

Thermosetting polymers consist of crosslinked three-dimensional structures. The crosslinking is obtained by curing reactive groups inside the so-called prepolymer. Curing for example can be obtained by heating the polymer chains or prepolymer in order to crosslink and harden the material permanently.

Thermoplastic polymers consist of linear or branched polymers, which are usually not cross-linked. They might be slightly cross-linked as long as they can be deformed by heat. However, these before mentioned core-shell particles are not easy to disperse or fast to disperse in all kind of resins or polymers or precursors to polymers, especially for example in liquid epoxy resins or liquid monomers or other liquid polymeric precursors.

A good homogenous and fast dispersion is necessary for having satisfying impact performance in the final polymeric composition. An easy dispersion making and fast dispersion time is also required to reduce the process time and gain on an easier simpler process.

An objective of the present invention is to propose a polymeric composition in form of a polymer powder which is rapidly and easily dispersible, especially in liquid resins as for example precursors for thermoset polymers or thermoplastic polymers as respectively for instance in epoxy resins or in (meth)acrylic monomers, but also polymer melts.

An additional objective of the present invention is to propose a polymeric composition in form of a dry polymer powder which is easily dispersible, especially in liquid resins as for example epoxy resins or (meth)acrylic monomers, but also polymer melts.

An objective of the present invention is also to propose a multistage polymer composition in form of a polymer powder which is easily dispersible in reactive epoxy resins, polyester resins or (meth)acrylic resins/polymers or liquid monomers or resins.

An additional objective of the present invention is to propose a multistage polymer composition in form of a dry polymer powder which is easily dispersible in reactive epoxy resins, polyester resins or (meth)acrylic resins/polymers or liquid monomers or resins, but also polymer melts.

Another objective of the present invention is to propose a process for making a multistage polymer composition in form of a polymer powder which is easily dispersible in in reactive epoxy resins, polyester resins or (meth)acrylic resins/polymers or liquid monomers or resins, but also polymer melts.

Still another objective of the present invention is a process for manufacturing a dry multistage polymer composition in form of a polymer powder which is easily dispersible in in reactive epoxy resins, polyester resins or (meth)acrylic resins/polymers or liquid monomers or resins but also polymer melts.

Still an additional objective is to propose an impact modified cured resin or adhesive composition, with satisfying impact properties.

Still another objective of the present invention is the use of a polymeric composition in form of a polymer powder for preparing a liquid composition comprising precursors for thermoset polymers or thermoplastic polymers, as for example liquid reactive epoxy resins or (meth)acrylic monomers in which is dispersed the polymeric composition.

Still another objective is to reduce the time of dispersing a polymer powder in such a liquid composition.

Still an additional objective is to propose an impact modifier in form of a polymer powder which is rapidly and easily dispersible, especially in liquid resins as for example precursors for thermoset polymers or thermoplastic polymers as respectively for instance epoxy resins or (meth) acrylic monomers.

[Background of the Invention] Prior Art

The document WO2016/102666 discloses a composition comprising a multistage polymer and its method of preparation. The composition comprises as well a (meth) acrylic polymer that has a mass average molecular weight of less than 100 000 g/mol.

The document WO2016/102682 discloses a multistage polymer composition and its method of preparation. The multistage polymer comprises a last stage that comprises a (meth) acrylic polymer that has a mass average molecular weight of less than 100 000 g/mol The document FR 2934866 discloses polymer preparation of a specific core shell polymers with functional shell comprising hydrophilic monomers. The core shell polymers are used as impact modifier in thermoset polymers.

The document EP 1 632 533 describes a process for producing modified epoxy resin. The epoxy resin composition is having rubber like polymer particles dispersed in it, by a process that brings the particles in contact with an organic medium that disperses the rubber particles.

The document EP 1 666 519 discloses a process for producing rubbery polymer particle and process for resin composition containing the same.

The document EP 2 123 711 discloses a thermosetting resin composition having a rubbery polymer particles dispersed therein and process for production thereof.

The document EP 0066382A1 discloses a bulk flowable impact modifier particles. The coagulated impact modifier particles are coated or agglomerated with hard non-elastomeric high molecular weight polymer. The hard non-elastomeric high molecular weight polymer has a viscosity average molecular weight preferably above 800 000 and its weight ratio is between 0.1 and 10 wt %.

The document WO2019/012052 discloses a composition comprising a multistage polymer and its method of preparation. The composition comprises as well a (meth) acrylic polymer that has a mass average molecular weight between 100 000 g/mol and 1 000 000 g/mol.

The document WO2019/011984 discloses a curable resin composition. The curable polymeric resin composition comprising i. a resin system comprising at least one resin component, ii. a curative system, and iii. a particle system comprising a multistage polymeric particle comprising a polymer composition (PCI) comprising a) one stage (A) comprising a polymer (Al) having a glass transition temperature of less than 10° C., b) one stage (B) comprising a polymer (Bl) having a glass transition temperature of at least 60° C. and c) and a polymer (Cl) having a glass transition temperature of at least 30° C. wherein at least the component a) and the component b) of composition (PCI) are part of a multistage polymer (MPI), and characterized in that the polymer (Cl) has a mass average molecular weight Mw of at least IO0 000 g/mol and that the component c) represents at most 40 wt % of the composition based on the total weight of.

None of the prior art documents discloses powder composition comprising a multistage polymer combined with a (meth)acrylic polymer in form of a powder having the having a porosity expressed in total intruded volume of at last 1.2 ml/g as measured by mercury intrusion or a process for preparing it.

BRIEF DESCRIPTION OF THE INVENTION

Surprisingly it has been found that a polymer composition (PC1) in form of a polymer powder comprising a) one stage (A) comprising a polymer (A1) having a glass transition temperature of less than 10° C., b), one stage (B) comprising a polymer (B1) having a glass transition temperature of at least 60° C., and c) and a polymer (C1) having a glass transition temperature of at least 30° C., said polymer (C1) represents at most 40 wt % of the composition based on a), b) and c) only;

characterized in that at least the component a) and the component b) of composition (PC1) are part of a multistage polymer (MP1), and characterized in that the polymer (C1) has a mass average molecular weight Mw between 10 000 g/mol and 500 000 g/mol and that the polymer powder is having a total intruded volume of at least 1.2 ml/g as measured by mercury porosimetry; can be easily and rapidly dispersed in a polymeric matrix material for thermosetting polymers or thermoplastic polymers or their respective precursors as liquid resins and/or monomers.

Surprisingly it has also been found that a process for manufacturing the polymer composition (PC1) in form of a polymer powder comprising the steps of a) polymerizing by emulsion polymerization of a monomer or monomer mixture ($A_m$) to obtain one layer in stage (A) comprising polymer (A1) having a glass transition temperature of less than 10° C.;

b) polymerizing by emulsion polymerization of a monomer or monomer mixture ($B_m$) to obtain layer in stage (B) comprising a polymer (B1) having a glass transition temperature of at least 60° C.;

c) polymerizing by emulsion polymerization of a monomer or monomer mixture (Cm) to obtain a layer in a stage (C) comprising a polymer (C1) having a glass transition temperature of at least 30° C., so that said polymer (C1) represents at most 40 wt % of the composition based on a), b) and c) only;

d) coagulating the composition obtained in steps a) to c);

characterized in that the polymer (C1) has a mass average molecular weight Mw between 10 000 g/mol and 500 000 g/mol and; yields to a polymer composition in form of polymer powder having a total intruded volume of at least 1.2 ml/g as measured by mercury porosimetry and that be easily dispersed in a polymeric matrix material for thermosetting polymers or thermoplastic polymers or their respective precursors as liquid resins and/or monomers.

Surprisingly it has also been found that a process for manufacturing the polymer composition (PC1) in form of a polymer powder comprising the steps of a) polymerizing by emulsion polymerization of a monomer or monomer mixture ($A_m$) to obtain one layer in stage (A) comprising polymer (A1) having a glass transition temperature of less than 10° C.;

b) polymerizing by emulsion polymerization of a monomer or monomer mixture ($B_m$) to obtain a layer in stage (B) comprising a polymer (B1) having a glass transition temperature of at least 60° C.;

both together steps a) and b) giving a multistage polymer (MP1) and step c) blending the multistage polymer (MP1) with a polymer (C1) having a glass transition temperature of at least 30° C. said polymer (C1) represents at most 40 wt % of the composition based on a), b) and c) only;

d) coagulating the composition obtained in steps a) to c); characterized in that the polymer (C1) has a mass average molecular weight Mw between 10 000 g/mol and 500 000 g/mol; yields to a polymer composition in form of a polymer powder having a total intruded volume of at least 1.2 ml/g as measured by mercury porosimetry, that be easily dispersed in a polymeric matrix material for thermosetting polymers or thermoplastic polymers or their respective precursors as liquid resins and/or monomers.

Surprisingly it has also been found that that a process for manufacturing a liquid polymer composition LPC1 comprising the steps of a) providing a polymeric composition (PC1) in form of a porous polymer powder having total intruded volume of at least 1.2 ml/g as measured by mercury porosimetry, b) bringing into contact the polymeric composition (PC1) with a liquid composition LC1, yields to a liquid polymer composition where the polymeric composition POW1 is homogenously and fastly dispersed in the liquid composition LC1.

Surprisingly it has also been found that a polymeric composition (PC1) in form of a porous polymer powder POW1 having total intruded volume of at least 1.2 ml/g as measured by mercury porosimetry and can be used to prepare a liquid polymeric or prepolymeric compositions.

Surprisingly it has also been found that a polymeric composition (PC1) in form of a porous polymer powder POW1 having total intruded volume of at least 1.2 ml/g as measured by mercury porosimetry can be used to reduce the time of dispersing porous polymer powder POW1 for obtaining liquid polymeric or prepolymeric compositions.

Surprisingly it has additionally been found a process to reduce the time of dispersing a polymeric composition (PC1) in a liquid composition comprising the steps of:

a) providing a polymeric composition (PC1) in form of a porous polymer powder POW1 having total intruded volume of at least 1.2 ml/g as measured by mercury porosimetry, b) bringing into contact the polymeric composition (PC1) with a liquid composition LC1, which is faster than the same process using a polymeric composition in form of a polymer powder having a lower total intruded volume as measured by mercury porosimetry.

DETAILED DESCRIPTION OF THE INVENTION

According to a first aspect, the present invention relates to a polymer composition (PC1) in form of a polymer powder comprising a) one stage (A) comprising a polymer (A1) having a glass transition temperature of less than 10° C., b) one stage (B) comprising a polymer (B1) having a glass transition temperature of at least 60° C., and c) and a polymer (C1) having a glass transition temperature of at least 30° C. said polymer (C1) represents at most 40 wt % of the composition based on a), b) and c) only;

characterized in that at least the component a) and the component b) of composition (PC1) are part of a multistage polymer (MP1), characterized that the polymer (C1) has a mass average molecular weight Mw between 10 000 g/mol and 500 000 g/mol and that the polymer powder is having a total intruded volume of at least 1.2 ml/g as measured by mercury porosimetry.

According to a second aspect, the present invention relates to a process for manufacturing the polymer composition (PC1) comprising the steps of a) polymerizing by emulsion polymerization of a monomer or monomer mixture ($A_m$) to obtain one layer in stage (A) comprising polymer (A1) having a glass transition temperature of less than 10° C., b) polymerizing by emulsion polymerization of a monomer or monomer mixture ($A_m$) to obtain a layer in stage (B) comprising a polymer (B1) having a glass transition temperature of at least 60° C., c) polymerizing by emulsion polymerization of a monomer or monomer mixture (Cm) to obtain a layer in stage (C) comprising a polymer (C1) having a glass transition temperature of at least 30° C. said polymer (C1) represents at most 40 wt % of the composition based on a), b) and c) only;

d) coagulating the composition obtained in steps a) to c); characterized that the polymer (C1) has a mass average molecular weight Mw between 10 000 g/mol and 500 000 g/mol and that the polymer powder is having a total intruded volume of at least 1.2 ml/g as measured by mercury porosimetry.

In a third aspect the present invention relates to a process for manufacturing the polymer composition (PC1) comprising the steps of a) polymerizing by emulsion polymerization of a monomer or monomer mixture ($A_m$) to obtain one layer in stage (A) comprising polymer (A1) having a glass transition temperature of less than 10° C., b) polymerizing by emulsion polymerization of a monomer or monomer mixture ($B_m$) to obtain layer in stage (B) comprising a polymer (B1) having a glass transition temperature of at least 60° C., both together steps a) and b) giving a multistage polymer (MP1) and step c) blending multistage polymer (MP1) with a polymer (C1) having a glass transition temperature of at least 30° C. said polymer (C1) represents at most 40 wt % of the composition based on a), b) and c) only;

d) coagulating the composition obtained in steps a) to c); characterized that the polymer (C1) has a mass average molecular weight Mw between 10 000 g/mol and 500 000 g/mol and that the polymer powder is having a total intruded volume of at least 1.2 ml/g as measured by mercury porosimetry.

In a fourth aspect the present invention relates to the use of a polymer composition (PC1) as impact modifier.

In a fifth aspect the present invention relates to the use of a polymer composition (PC1) as a reduced dispersing time composition.

In a sixth aspect the present invention relates to a process to reduce the dispersing time of a polymer powder in a liquid composition by using the polymeric composition (PC1) in form of a polymer powder.

In a seventh aspect the present invention relates to a polymer composition PC2 comprising the polymer composition (PC1) as impact modifier.

In an eight aspect the present invention relates to a process to reduce the time of dispersing a polymeric composition (PC1) in a liquid composition comprising the steps of:

a) providing a polymeric composition (PC1) in form of a porous polymer powder POW1 having total intruded volume of at least 1.2 ml/g as measured by mercury porosimetry, b) bringing into contact the polymeric composition (PC1) with a liquid composition LC1.

By the term "polymer powder" as used is denoted a polymer in form of a powder comprising powder grains in the range of at least 1 μm, said powder grains are obtained by agglomeration of primary polymer particles comprising polymer or polymers, said primary polymer particles are in the nanometer range.

By the term "primary particle" as used is denoted a spherical polymer particle comprising particle in the nanometer range. Preferably the primary particle has a weight average particle size between 20 nm and 800 nm.

By the term "particle size" as used is denoted the volume average diameter of a particle considered as spherical.

By the term "thermoplastic polymer" as used is denoted a polymer that turns to a liquid or becomes more liquid or less viscous when heated and that can take on new shapes by the application of heat and pressure.

By the term "thermosetting polymer" as used is denoted a prepolymer in a soft, solid or viscous state that changes irreversibly into an infusible, insoluble polymer network by curing.

By the term "polymer composite" as used is denoted a multicomponent material comprising multiple different phase domains in which at least one type of phase domain is a continuous phase and in which at least one component is a polymer.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer, with at least two stages that are different in composition.

By the term "(meth)acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "dry" as used is denoted that the ratio of residual water is less than 1.5 wt and preferably less than 1.2 wt %.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

By the term "total intruded volume" as used is denoted the total volume intruded by liquid mercury according to ISO 15901-1:2016. This volume is cumulated and the analysis results show cumulated intruded volume in ml/g ($cm^3/g$) as function of the applied pressure or the pore diameter. The total intruded volume is the volume intruded at the maximal applied pressure, which corresponds also to the smallest pores.

By the term "incremental intrusion" as used is denoted the volume intruded in ml/g between two certain pressures or two pore sizes. This incremental intrusion can also be expressed relatively to the total intruded volume in vol %.

With easily dispersed in liquid resins is meant that a homogenous dispersion is obtained. The distribution of the polymeric composition (PC1) is not homogenous if separation takes place after initial homogenization.

With fast dispersed in liquid resins is meant that a homogeneous dispersion is obtained much faster than with a polymeric composition (PC1) not having the minimal required porosity With regard to the polymer composition (PC1) according to the invention, it is in form of a polymer powder, also referred to as polymer powder POW1, comprising a) one stage (A) comprising a polymer (A1) having a glass transition temperature of less than 10° C., b) one stage (B) comprising a polymer (B1) having a glass transition temperature of at least 60° C. and c) and a polymer (C1) having a glass transition temperature of at least 30° C.; where at least the component a) and the component b) of composition (PC1) are part of a multistage polymer (MP1), and characterized in that the polymer (C1) has a mass average molecular weight Mw between 10 000 g/mol and 500 000 g/mol and that the polymer composition (PC1) in form of a polymer powder is having a total intruded volume of at least 1.2 ml/g as measured by mercury porosimetry.

The component c) represents at most 40 wt % of the composition based on a) b) and c). Preferably the component c) represents at most 35 wt % of the composition based on a), b) and c); more preferably at most 30 wt %, still more preferably less than 30 wt %, advantageously less than 25 wt % and more advantageously less than 20 wt %.

Preferably the component c) represents more than 4 wt % of the composition based on a), b) and c). More preferably the component c) represents more than 5 wt % of the composition based on a), b) and c); even more preferably more than 6 wt %, still more preferably more than 7 wt %, advantageously more than 8 wt % and more advantageously more than 10 wt %.

The respective upper and lower limits given in the previous two paragraphs for the quantity of component c), can be combined in any combinations of one upper and one lower limit Preferably the component c) represents between 4 wt % and 40 wt % of the composition based on a) b) and c). More preferably the component c) represents between 5 wt % and 35 wt % of the composition based on a), b) and c); even more preferably between 6 wt % and 30 wt %, still more preferably between 7 wt % and less than 30 wt %, advantageously between 7 wt % and less than 25 wt % and more advantageously between 10 wt % and less than 20 wt %.

At least the component a) and the component b) of composition (PC1) are part of a multistage polymer (MP1).

At least the component a) and the component b) are obtained by a multistage process comprising at least two stages (A) and (B) respectively; and these two, polymer (A1) and polymer (B1) form a multistage polymer.

With regard to the polymer powder POW1 of the invention, it has a volume median particle size D50 between 1 μm and 700 μm. Preferably the volume median particle size of the polymer powder is between 10 μm and 600 μm, more preferably between 15 μm and 550 μm and advantageously between 20 μm and 500 μm.

The D10 of the particle size distribution in volume is at least 7 μm and preferably 10 μm, more preferably 15 μm.

The D90 of the particle size distribution in volume is at most 1000 μm and preferably 950 μm, more preferably at most 900 μm and even more preferably at most 800 μm.

The porosity of the polymer composition (PC1) in form of a polymer powder POW1 is expressed as total intruded volume or total cumulative intrusion (cumulative intruded volume) in millilitre (ml) of mercury per mass (g) of said polymer powder POW1. This is measured according to the norm ISO 15901-1: Evaluation of pore size distribution and porosity of solid materials by mercury porosity and gas adsorption—Part 1: mercury porosity. The porous polymer powder POW1 of the invention has a total intruded volume or total cumulative intrusion of at least 1.2 ml/g, preferably 1.25 ml/g, more preferably 1.3 ml/g, even more preferably 1.35 ml/g. The total cumulative intrusion is taken into account until a pore size diameter of 0.005 μm. Preferably the total intruded volume or total cumulative intrusion is taken into account between a pore size diameter of 100 μm and 0.005 μm or a pressure between 0.01 MPa and 400 MPa.

The porous polymer powder POW1 of the invention has a total intruded volume or total cumulative intrusion of at most 10 ml/g. Preferably the total intruded volume is at most 8 ml/g, more preferably at most 7 ml/g, even more preferably at most 6 ml/g, advantageously at most 5 ml/g and most advantageously at most 4 ml/g.

The respective upper and lower limits given in the previous two paragraphs for total intruded volume or total cumulative intrusion of the porous polymer powder POW1 of the invention, can be combined in any combinations of one upper and one lower limit.

Preferably the porous polymer powder POW1 of the invention has a total intruded volume or total cumulative intrusion between 1.2 ml/g and 10 ml/g, more preferably between 1.25 ml/g and 8 ml/g, even more preferably between 1.3 ml/g and 7 ml/g, advantageously between 1.35 ml/g and 6 ml/g, more advantageously between 1.35 ml/g and 5 ml/g and most advantageously between 1.35 ml/g and 4 ml/g.

The incremental intrusion (incremental intruded volume) is the volume between two certain pore diameters. The incremental intrusion can be expressed as an absolute value also in ml/g or as a relative value es percentage of total intruded volume or total cumulative intrusion (which is taken into account between a pore size diameter of 100 μm and 0.005 μm).

Preferably the porous polymer powder POW1 of the invention has a cumulative intrusion for a pore size above 10 μm (larger than 10 μm) of at least 0.9 ml/g, more preferably at least lml/g.

Preferably the porous polymer powder POW1 of the invention has a relative incremental intrusion for a pore size above 10 μm (larger than 10 μm) of at most 85%, more preferably at most 82% and even more preferably at most 80%.

Preferably the porous polymer powder POW1 of the invention has an incremental intrusion between a pore size from 10 μm to 1 μm of at least 0.1 ml/g, more preferably at least 0.12 ml/g and even more preferably at least 0.15 ml/g.

Preferably the porous polymer powder POW1 of the invention has a relative incremental intrusion between a pore size from 10 μm to 0.1 μm of at least 5%, more preferably at least 8% and even more preferably at least 10%.

Preferably the porous polymer powder POW1 of the invention has an incremental intrusion between a pore size from 10 μm to 0.1 μm of at least 0.15 ml/g, more preferably at least 0.2 ml/g and even more preferably at least 0.25 ml/g.

Preferably the porous polymer powder POW1 of the invention has a relative incremental intrusion between a pore size from 10 μm to 0.1 μm of at least 10%, more preferably at least 15% and even more preferably at least 20%.

Preferably the porous polymer powder POW1 of the invention has an incremental intrusion between a pore size from 1 μm to 0.1 μm of at least 0.05 ml/g, more preferably at least 0.06 ml/g and even more preferably at least 0.07 ml/g.

Preferably the porous polymer powder POW1 of the invention has a relative incremental intrusion between a pore size from 1 μm to 0.1 μm of at least 5%, more preferably at least 7.5% and even more preferably at least 10%.

The apparent bulk density of the polymer powder POW1 is less than 0.60 $g/cm^3$. Preferably the apparent bulk density is less than 0.45 $g/cm^3$, more preferably less than 0.43 $g/cm^3$, and even more preferably less than 0.41 $g/cm^3$.

The apparent bulk density of the polymer powder POW1 is more than 0.1 $g/cm^3$. Preferably the apparent bulk density is more than 0.11 $g/cm^3$, more preferably is more than 0.12 $g/cm^3$, even more preferably more than 0.13 $g/cm^3$.

The apparent bulk density of the polymer powder POW1 is between 0.1 $g/cm^3$ and 0.60 $g/cm^3$. Preferably the apparent bulk density of the polymer powder POW1 is between 0.12 $g/cm^3$ and 0.45 $g/cm^3$.

The respective preferred embodiment of all the different characteristics of the porous polymer powder POW1 of the invention, can be combined.

The multistage polymer (MP1) of the composition (PC1) according to the invention has at least two stages (A) and (B) respectively; and these two, comprising polymer (A1) and polymer (B1) respectively that are different in their polymer composition.

The multistage polymer (MP1) is preferably in form of polymer particles considered as spherical particles PAR. These particles PAR are also called core-shell particles. The first stage forms the core, the second or all following stages form the respective shells. Such a multistage polymer which is also called core-shell particle is preferred.

The particles PAR, comprised in the polymer composition (PC1) in form of a polymer powder according to the invention, are the primary particles. The particles PAR have a weight average particle size between 15 nm and 900 nm. Preferably the weight average particle size of the polymer particle is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The primary polymer particles PAR are agglomerated are giving the polymer composition (PC1) or a part of the polymer composition (PC1) in form of the polymer powder of the invention.

The polymer composition (PC1) according to the invention comprises a multistage polymer (MP1) comprising at least a) one stage (A) comprising a polymer (A1) having a glass transition temperature below 10° C., and at least b) one stage (B) comprising a polymer (B1) having a glass transition temperature over 60° C.

In a first preferred embodiment the stage (A) is the first stage of the at least two stages and the stage (B) comprising polymer (B1) is grafted on stage (A) comprising polymer (A1) or another intermediate layer.

In a second preferred embodiment, there could also be another stage before stage (A), so that stage (A) would also be a shell.

In a third preferred embodiment the polymer (C1) having a glass transition temperature over 30° C. is also part of the multistage polymer (MP1). There is also at least one stage (C). Preferably the stage (C) takes place after stage (B). More preferably stage (C) is the last stage and the polymer (C1) is the outer shell of the multistage polymer (MP1).

In a first embodiment the polymer (A1) having a glass transition temperature below 10° C. comprises at least 50 wt % of polymeric units coming from alkyl acrylate or alkyl acrylates and the stage (A) is the most inner layer of the polymer particle having the multilayer structure. In other words the stage (A) comprising the polymer (A1) is the core of the polymer particle.

With regard to the polymer (A1) of the first preferred embodiment, it is a (meth) acrylic polymer comprising at least 50 wt % of polymeric units coming from acrylic monomers. Preferably 60 wt % and more preferably 70 wt % of the polymer (A1) are acrylic monomers.

The acrylic momonomer in polymer (A1) comprises monomers chosen from C1 to C18 alkyl acrylates or mixtures thereof. More preferably the acrylic monomer in polymer (A1) comprises monomers of C2 to C12 alkyl acrylic monomers or mixtures thereof. Still more preferably the acrylic monomer in polymer (A1) comprises monomers of C2 to C8 alkyl acrylic monomers or mixtures thereof.

The polymer (A1) can comprise a comonomer or comonomers which are copolymerizable with the acrylic monomer, as long as polymer (A1) is having a glass transition temperature of less than 10° C.

The comonomer or comonomers in polymer (A1) are preferably chosen from (meth)acrylic monomers and/or vinyl monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 10° C.

In a specific embodiment polymer (A1) is a homopolymer of butyl acrylate.

More preferably the glass transition temperature Tg of the polymer (A1) comprising at least 70 wt % of polymeric units coming from C2 to C8 alkyl acrylate is between −100° C. and 10° C., even more preferably between −80° C. and 0° C. and advantageously between −80° C. and −20° C. and more advantageously between −70° C. and −20° C.

In a second preferred embodiment the polymer (A1) having a glass transition temperature below 10° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In a preferred embodiment the core is a butadiene homopolymer.

More preferably the glass transition temperature Tg of the polymer (A1) comprising at least 50 wt % of polymeric units coming from isoprene or butadiene is between −100° C. and 10° C., even more preferably between −90° C. and 0° C., advantageously between −80° C. and 0° C. and most advantageously between −70° C. and −20° C.

In a third preferred embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

The polymer (A1) having a glass transition temperature below 10° C. comprises monomer units, that have been polymerized. The polymer (A1) in general and respective polymers (A1) of the first, second and third preferred embodiment are prepared from the respective monomer or monomer mixture ($A_m$) yielding to the monomer units comprised polymer (A1).

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, methyl methacrylate, ethyl methacrylate, butyl methacrylate and mixtures thereof, as long as polymer (B1) is having a glass transition temperature of at least 60° C.

Advantageously the polymer (B1) comprises at least 70 wt % of monomer units coming from methyl methacrylate.

Preferably the glass transition temperature Tg of the polymer (B1) is between 60° C. and 150° C. The glass transition temperature of the polymer (B1) is more preferably between 80° C. and 150° C., advantageously between 90° C. and 150° C. and more advantageously between 100° C. and 150° C.

Preferably the polymer (B1) is grafted on the polymer made in the previous stage.

In certain embodiments the polymer (B1) is crosslinked.

In one embodiment the polymer (B1) comprises a functional comonomer. The functional copolymer is chosen from acrylic or methacrylic acid, the amides derived from this acids, such as for example dimethylacrylamide, 2-methoxyethyl acrylate or methacrylate, 2-aminoethyl acrylate or methacrylate which are optionally quaternized, polyethylene glycol (meth) acrylates, water soluble vinyl monomers such as N-vinyl pyrrolidone or mixtures thereof. Preferably the polyethylene glycol group of polyethylene glycol (meth) acrylates has a molecular weight ranging from 400 g/mol to 10 000 g/mol.

The polymer (B1) having a glass transition temperature of at least 60° C. comprises monomer units, that have been polymerized. The polymer (B1) in general and in the respective embodiments is prepared from the respective monomers or monomer mixtures ($B_m$) yielding to the monomer units comprised polymer (B1).

With regard to the polymer (C1), it has a mass average molecular weight Mw of between 10 000 g/mol and 500 000 g/mol.

The polymer (C1), it has a mass average molecular weight Mw of more than 10 000 g/mol, preferably more than 10 500 g/mol, more preferably more than 11 000 g/mol, still more preferably more than 12 000 g/mol, advantageously more than 13 000 g/mol, more advantageously more than 14 000 g/mol and still more advantageously more than 15 000 g/mol.

The polymer (C1), it has a mass average molecular weight Mw below 500 000 g/mol, preferably below 450 000 g/mol, more preferably below 400 000 g/mol, still more preferably below 400 000 g/mol, advantageously below 350 000 g/mol, more advantageously below 300 000 g/mol and still more advantageously below 250 000 g/mol and most advantageously below 200 000 g/mol.

Preferably the mass average molecular weight Mw of polymer (C1) is between 10 500 g/mol and 450 000 g/mol, more preferable between 11 000 g/mol and 400 000 g/mol and even more preferably between 12 000 g/mol and 350 000 g/mol advantageously between 13 000 g/mol and 300 000 g/mol, more advantageously between 14 000 g/mol and 250 000 g/mol and most advantageously between 15 000 g/mol and 200 000 g/mol.

In a first advantageously embodiment the mass average molecular weight Mw of the (meth)acrylic polymer MP1 is between 10 500 g/mol and 200 000 g/mol, more preferable between 11 000 g/mol and 190 000 g/mol and even more preferably between 12 000 g/mol and 180 000 g/mol advantageously between 13 000 g/mol and 150 000 g/mol, more advantageously between 14 000 g/mol and 135 000 g/mol and most advantageously between 15 000 g/mol and 120 000 g/mol.

In a second advantageously embodiment the mass average molecular weight Mw of the (meth)acrylic polymer MP1 is between 15 000 g/mol and 450 000 g/mol, more preferable between 16 000 g/mol and 400 000 g/mol and even more preferably between 17 000 g/mol and 350 000 g/mol advantageously between 18 000 g/mol and 300 000 g/mol, more advantageously between 19 000 g/mol and 250 000 g/mol and most advantageously between 20 000 g/mol and 200 000 g/mol.

Preferably the polymer (C1) is a copolymer comprising (meth)acrylic monomers. More preferably the polymer (C1) is a (meth) acrylic polymer. Still more preferably the polymer (C1) comprises at least 70 wt % monomers chosen from C1 to C12 alkyl (meth)acrylates. Advantageously the polymer (C1) comprises at least 80 wt % of monomers C1 to C4 alkyl methacrylate and/or C1 to C8 alkyl acrylate monomers.

Preferably the glass transition temperature Tg of the polymer (C1) is between 30° C. and 150° C. The glass transition temperature of the polymer (C1) is more preferably between 40° C. and 150° C., advantageously between 45° C. and 150° C. and more advantageously between 50° C. and 150° C.

Preferably the polymer (C1) is not crosslinked.

Preferably the polymer (C1) is not grafted on any of the polymers (A1) or (B1), especially if it is part of the multistage polymer (MP1). By not grafted is meant that at least 50 wt % of the polymer (C1) in the multistage polymer (MP1) can be solubilized in a solvent of the polymer (C1).

In one embodiment the polymer (C1) comprises also a functional comonomer.

The functional comonomer has the formula (1)

(1)

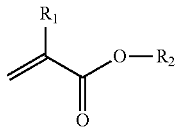

wherein $R_1$ is chosen from H or $CH_3$ and $R_2$ is H or an aliphatic oraromatic radical having at least one atom that is not C or H.

Preferably the functional monomer is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, polyethylene glycol (meth) acrylates. Preferably the polyethylene glycol group of polyethylene glycol (meth) acrylates has a molecular weight ranging from 400 g/mol to 10 000 g/mol.

In a first preferred embodiment the polymer (C1) comprises from 80 wt % to 100 wt % methyl methacrylate, preferably from 80 wt % to 99.9 wt % methyl methacrylate and from 0.1 wt % to 20 wt % of a C1 to C8 alkyl acrylate monomer. Advantageously the C1 to C8 alkyl acrylate monomer is chosen from methyl acrylate, ethyl acrylate or butyl acrylate.

In a second preferred embodiment the polymer (C1) comprises between 0 wt % and 50 wt % of a functional monomer. Preferably the meth)acrylic polymer (C1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (2) or (3)

(2)

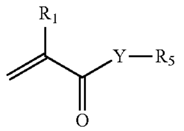

(3)

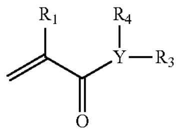

wherein in both formulas (2) and (3) $R_1$ is chosen from H or $CH_3$; and in formula (2) Y is 0, $R_5$ is H or an aliphatic or aromatic radical having at least one atom that is not C or H; and in formula (3) Y is N and $R_4$ and/or $R_3$ is H or an aliphatic or aromatic radical.

Preferably the functional monomer (2) or (3) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol.

The polymer (C1) having a glass transition temperature of at least 30° C. comprises monomer units, that have been polymerized. The polymer (C1) in general and in the respective embodiments is prepared from the respective monomers or monomer mixtures ($C_m$) yielding to the monomer units comprised polymer (C1).

The respective preferred embodiment of all the different characteristics of the polymers (A1), (B1) and (C1), can be combined in any combination.

The multistage polymer (MP1) is obtained by a multistage process comprising at least two stages. At least the component a) and the component b) of composition (PC1) are part of a multistage polymer (MP1).

Preferably the polymer (A1) having a glass transition temperature below 10° C. made during the stage (A), is made before stage (B) or is the first stage of the multistage process.

Preferably the polymer (B1) having a glass transition temperature over 60° C. made during the stage (B) is made after the stage (A) of the multistage process.

In a first preferred embodiment the polymer (B1) having a glass transition temperature of at least 60° C. is an intermediate layer of the polymer particle having the multilayer structure.

In this first preferred embodiment the polymer (C1) having a glass transition temperature over 30° C. made during the stage (C), is made after the stage (B) of the multistage process.

More preferably the polymer (C1) having a glass transition temperature over 30° C. made during the stage (C) is the external layer of the multistage polymer (MP1) or the primary polymer particle having the multilayer structure.

There could be additional intermediate stages, either between stage (A) and stage (B) and/or between stage (B) and stage (C).

The polymer (C1) and the polymer (B1) are not the same polymer, even if their composition could be very close and some of their characteristics are overlapping. The essential difference is that the polymer (B1) is always part of the multistage polymer (MP1).

This is more explained in the process for preparing the polymeric composition (PC1) according to the invention comprising the polymer (C1) and the multi stage polymer (MP1).

The weight ratio r of the polymer (C1) of the external layer comprised in stage (C) in relation to the complete polymer particle is at least 5 wt %, more preferably at least 7 wt % and still more preferably at least 10 wt %.

According to the invention the ratio r of the external stage (C) comprising polymer (C1) in relation to the complete polymer particle is at most 40 w %.

Preferably the ratio of polymer (C1) in view of the primary polymer particle is between 5 wt % and 30 wt % and preferably between 5 wt % and 20 wt %.

In a second preferred embodiment the polymer (B1) having a glass transition temperature of at least 60° C. is the external layer of the primary polymer particle having the multilayer structure in other words the multistage polymer (MP1).

Preferably at least a part of the polymer (B1) of layer (B) is grafted on the polymer made in the previous layer. If there are only two stages (A) and (B) comprising polymer (A1) and (B1) respectively, a part of polymer (B1) is grafted on polymer (A1). More preferably at least 50 wt % of polymer (B1) is grafted. The ratio of grafting can be determined by extraction with a solvent for the polymer (B1) and gravimetric measurement before and after extraction to determine the non-grafted quantity.

The glass transition temperature Tg of the respective polymers can be estimated for example by dynamic methods as thermo mechanical analysis.

In order to obtain a sample of the respective polymers (A1), (B1) and (C1) they can be prepared alone, and not by a multistage process, for estimating and measuring more easily the glass transition temperature Tg individually of the respective polymers of the respective stages. The polymer (C1) can be extracted for estimating and measuring the glass transition temperature Tg.

Preferably the polymer composition of the invention comprises no solvents. By no solvents is meant that eventually present solvent make up less than 1 wt % of the composition. The monomers of the synthesis of the respective polymers are not considered as solvents. The residual monomers in the composition present less than 2 wt % of the composition.

Preferably the polymer composition according to the invention is dry. By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The composition according to the invention does not comprise any voluntary added solvent. Eventually residual monomer from the polymerization of the respective monomers and water are not considered as solvents.

The polymer composition (PC1) in form of a polymer powder POW1 of the invention comprises polymeric particles PAR. If there are several different kind of particles they are called respectively PAR1, PAR2, ect. The polymeric particles PAR make up at least 50 wt % of the polymer powder composition POW1. More preferably the polymeric particles PAR1 make up at least 60 wt %, still more preferably at least 70 wt % of the polymer powder composition POW1.

In a first preferred embodiment, the polymer composition (PC1) in form of a polymer powder POW1 of the invention consists only of polymeric particles PAR1. The polymeric particles PAR1 consists of a multistage polymer (MP1) that comprises the component a), b) and c).

In a second preferred embodiment, the polymer composition (PC1) in form of a polymer powder POW1 of the invention comprises at least 60 wt % of polymeric particles PAR1. The polymeric particles PAR1 consists of a multistage polymer (MP1) that comprises at least the components a) and b).

In a third preferred embodiment, the polymer composition (PC1) in form of a polymer powder POW1 of the invention comprises polymeric particles PAR1. The polymeric particles PAR1 consists of a multistage polymer (MP1) that comprises the component a), b) and c).

In a fourth preferred embodiment the polymer composition (PC1) in form of a polymer powder POW1 of the invention comprises two different kind of particles PAR1 and PAR2. The polymeric particles PAR1 consists of the multistage polymer (MP1) that comprises the component a) and b). The polymeric particles PAR2 comprise or consists of the polymer (C1).

With regard to a first preferred process for manufacturing the polymer composition (PC1) according to the invention it comprises the steps of a) polymerizing by emulsion polymerization of a monomer or monomer mixture ($A_m$) to obtain one layer in stage (A) comprising polymer (A1) having a glass transition temperature of less than 10° C.,
b) polymerizing by emulsion polymerization of a monomer or monomer mixture ($B_m$) to obtain layer in stage (B) comprising a polymer (B1) having a glass transition temperature of at least 60° C.,
c) polymerizing by emulsion polymerization of a monomer or monomer mixture (Cm) to obtain a layer in stage (C) comprising a polymer (C1) having a glass transition temperature of at least 30° C.,
d) coagulating the composition obtained in steps a) to c).

Preferably the step a) is made before step b).

More preferably step b) is performed in presence of the polymer (A1) obtained in step a).

Advantageously the first preferred process for manufacturing the polymer composition (PC1) according to the invention is a multistep process comprises the steps one after the other of a) polymerizing by emulsion polymerization of a monomer or monomer mixture ($A_m$) to obtain one layer in stage (A) comprising polymer (A1) having a glass transition temperature of less than 10° C.,
b) polymerizing by emulsion polymerization of a monomer or monomer mixture ($B_m$) to obtain layer in stage (B) comprising a polymer (B1) having a glass transition temperature of at least 60° C.
c) polymerizing by emulsion polymerization of a monomer or monomer mixture (Cm) to obtain a layer in stage (C) comprising a polymer (C1) having a glass transition temperature of at least 30° C.,
d) coagulating the composition obtained in steps a) to c).

Preferably the steps a), b), c) and d) are performed in that order. As emulsion polymerization is used, the polymer composition at the end of the polymerization is obtained as an aqueous dispersion.

The respective monomers or monomer mixtures ($A_m$), ($B_m$) and ($C_m$) for forming the layers in the stages (A), (B) and (C) respectively comprising the polymers (A1), (B1) and (C1) respectively, are the same as defined before. The monomers or monomer mixtures ($A_m$), ($B_m$) and ($C_m$) comprise the respective monomers that are as polymerized monomer units in the polymer chain of the respective polymers (A1), (B1) and (C1). The characteristics of the polymers (A1), (B1) and (C1) respectively, are the same as defined before.

With regard to a second preferred process for manufacturing the polymeric composition (PC1) comprising the polymer (C1) and the multi stage polymer (MP1), it comprises the steps of a) polymerizing by emulsion polymerization of a monomer or monomer mixture ($A_m$) to obtain one layer in stage (A) comprising polymer (A1) having a glass transition temperature of less than 10° C., b) polymerizing by emulsion polymerization of a monomer or monomer mixture ($B_m$) to obtain layer in stage (B) comprising a polymer (B1) having a glass transition temperature of at least 60° C., both together steps a) and b) giving a multistage polymer (MP1) and step c) blending multistage polymer (MP1) with a polymer (C1) having a glass transition temperature of at least 30° C., d) coagulating the composition obtained in steps a) to c).

Preferably, the polymer (C1) is in form of an aqueous dispersion. The aqueous dispersion comprises the polymer (C1) in form of polymeric particles.

With regard to a third preferred process for manufacturing the polymeric composition (PC1) comprising the polymer (C1) and the multi stage polymer (MP1), it comprises the step of a) providing a polymer (C1) having a glass transition temperature of at least 30° C. and a multistage polymer (MP1) comprising one stage (A) comprising a polymer (A1) having a glass transition temperature of less than 10° C. and one stage (B) comprising a polymer (B1) having a glass transition temperature of at least 60° C., b) mixing or blending of the polymer (C1) and the multi stage polymer (MP1), c) coagulating the composition obtained in steps b)

wherein the polymer (C1) and the multi stage polymer (MP1) in step b) are in form of a dispersion in aqueous phase. The respective aqueous dispersions comprises the polymer (C1) and the multi stage polymer (MP1) in form of polymeric particles.

Preferably the multi stage polymer (MP1) and the polymer (C1) are already provided as an aqueous dispersion.

The quantities of the aqueous dispersion of the polymer (C1) and the aqueous dispersion of the multi stage polymer (MP1) are chosen in a way that the weight ratio of the multi stage polymer based on solid part only in the obtained mixture is at least 60 wt %, preferably at least 65 wt %, more preferably at least 68 wt % and advantageously at least 70 wt %.

The quantities of the aqueous dispersion of the polymer (C1) and the aqueous dispersion of the multi stage polymer (MP1) are chosen in a way that the weight ratio of the multi stage polymer based on solid part only in the obtained mixture is at most 99 wt %, preferably at most 95 wt % and more preferably at most 90 wt %.

The quantities of the aqueous dispersion of the polymer (C1) and the aqueous dispersion of the multi stage polymer are chosen in a way that the weight ratio of the multi stage polymer based on solid part only in the obtained mixture is between 60 wt % and 99 wt %, preferably between 65 wt % and 95 wt % and more preferably between 68 wt % and 90 wt %.

The preferred processes for manufacturing the polymer composition (PC1) comprising the polymer (C1) and the multi stage polymer (MP1) yields to the polymer powder POW1. The polymer powder POW1 is in form of grains (large particles). The polymer powder grain or particle comprises agglomerated primary polymer particles made by multistage process comprising the multistage polymer (MP1) and the polymer (C1) or agglomerated primary polymer particles comprising the multistage polymer (MP1) and the polymer (C1).

The aqueous composition comprising the multi stage polymer (MP1) and the polymer (C1), before starting the coagulation, has a solid content below 35 wt %. If the solid content is higher than 35 wt %, water is added in order to adapt the solid content. Preferably the solid content is below 34 wt %, more preferably below 33 wt % and advantageously below 32 wt %.

The solid content is measured or estimated gravimetrically, by weighting before and after complete evaporation of water.

In a first preferred embodiment the solid content of aqueous composition comprising the multi stage polymer (MP1) and the polymer (C1), before starting the coagulation, is between 5 wt % and 35 wt %, more preferably between 6 wt % and 34 wt %, still more preferably between 7 wt % and 33 wt % and advantageously between 8 wt % and 32 wt %.

In a second preferred embodiment the solid content of aqueous composition comprising the multi stage polymer (MP1) and the polymer (C1), before starting the coagulation, is between 20 wt % and 35 wt %, more preferably between 20 wt % and 34 wt %, still more preferably between 20 wt % and 33 wt % and advantageously between 20 wt % and 32 wt %.

In a third preferred embodiment the solid content of aqueous composition comprising the multi stage polymer (MP1) and the polymer (C1), before starting the coagulation, is between 5 wt % and 20 wt %, more preferably between 6 wt % and 20 wt %, still more preferably between 7 wt % and 20 wt % and advantageously between 8 wt % and 20 wt %.

In a fourth preferred embodiment the solid content of aqueous composition comprising the multi stage polymer (MP1) and the polymer (C1), before starting the coagulation, is between 10 wt % and 25 wt %, more preferably between 11 t % and 24 wt %, still more preferably between 12 wt % and 23 wt % and advantageously between 13 wt % and 22 wt %.

In a fifth preferred embodiment the solid content of aqueous composition comprising the multi stage polymer (MP1) and the polymer (C1), before starting the coagulation, is between 15 wt % and 27 wt %, more preferably between 17 wt % and 27 wt %, still more preferably between 19 wt % and 27 wt % and advantageously between 21 wt % and 27 wt %.

The coagulation can be made with a salt or an inorganic acid.

In a first preferred embodiment, the coagulation is made with an inorganic acid.

The process for manufacturing the polymer composition (PC1) according to the invention can comprise optionally the additional step e) of drying of the polymer composition.

Preferably after the drying step an e) the polymer composition comprises less than 3 wt %, more preferably less than 1.5 wt % advantageously less than 1.2% of humidity or water.

The humidity of a polymer composition can be measure with a thermo balance.

The drying of the polymer can be made in an oven or vacuum oven with heating of the composition for 48 hours at 50° C.

The liquid composition LC1 of the eighth aspect of the invention, is a precurser for a thermosetting polymers or thermoplastic polymers. This can be a monomer, a mixture of monomers, a polymerizable or curable oligomer, a mixture of polymerizable or curable oligomer with momomer (s), or a mixture of polymers with momomer(s), which are liquid at 25° C. Preferably the liquid has a dynamic viscosity of less than 1000 Pa*s, and more preferably between 0.5 mPa*s and 1000 Pa*s. The value of the dynamic viscosity is taken at a shear rate of 11/s. The viscosity is measured with a rheometer.

For example the liquid composition LC1 can be chosen from compositions for preparing vinyl ester, unsaturated polyester or epoxy resin; or it can be for example a styrenic monomer or an (meth)arylic monomer, or a mixture thereof or a liquid composition comprising said monomers.

Preferably the polymeric composition (PC1) represents between 0.5 and 50 wt % of the composition comprising liquid composition LC1 and polymeric composition (PC1).

The present invention relates also to the use of the polymer composition (PC1) in form of the polymer powder according to the invention as an impact modifier in polymers, in order to obtain an impact modified polymer composition. Preferably the polymers are thermosetting polymers or thermoplastic polymers or its precursors.

The process to reduce the dispersion time is comprising in a first preferred embodiment the steps of: —providing a precursor for a thermosetting polymer or a monomer of a thermoplastic polymer and—bringing into contact the polymeric composition (PC1) and said precursor.

The process to reduce the dispersion time comprises in a second preferred embodiment at least the step of providing a polymeric composition (PC1) in form of a polymer powder having total intruded volume of at least 1.2 ml/g as measured by mercury porosimetry.

The process in the second preferred embodiment optionally also comprises the step of providing a precursor for a thermosetting polymer or a monomer of a thermoplastic polymer. Preferably, the precursor is liquid. More preferably the precursor has a viscosity between 0.5 mPas 1000 Pa*s at a temperature of 25° C. The viscosity is the dynamic viscosity.

The process to reduce the dispersion time in the second preferred embodiment optionally also comprises the step of bringing into contact the polymeric composition (PC1) in form of a polymer powder and said precursor. Preferably between 0.5 parts by weight and 100 parts by weight polymeric composition (PC1) in form of polymer powder are brought into contact for 100 parts by weight of said precursor.

The polymer composition (PC2) can be a thermoset polymer or its precursor, or a thermoplastic polymer. The polymer composition PC2 can also be an adhesive and more preferably a structural adhesive.

[Methods of Evaluation]

Glass Transition Temperature

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is highest temperature value read in the tan delta curve, when the derived of tan delta is equal to zero.

Molecular Weight

The mass average molecular weight (Mw) of the polymers is measured with by size exclusion chromatography (SEC). Polystyrene standards are used for calibration. The polymer is dissolved in THF at a concentration of 1 g/L. The chromatography column uses modified silica. The flow is 1 ml/min and a detector for refractive index is used.

Particle Size Analysis

The particle size of the primary particles after the multistage polymerization is measured with a Zetasizer from Malvern using dynamic lightscattering. As result the weight average particle size (diameter) is taken.

The particle size of the polymer powder after recovering is measured with Malvern Mastersizer 3000 from MALVERN with laser diffraction.

For the estimation of weight average powder particle size, particle size distribution and ratio of fine particles a Malvern Mastersizer 3000 apparatus with a 300 mm lenses, measuring a range from 0.5-880 μm is used.

Dispersion test, a sample of the respective powder is dispersed in a liquid composition. The results of dispersion test are given in ++ and – symbols. This signifies how fast and easy the powder dispersed in a liquid composition. A—symbol signifies bad dispersion, the powder maybe still separated after the dispersion test either floating, sinking or other phase separation. A+ or ++ symbol signifies good instantly dispersion or a very good instantly dispersion. In the examples, the monomer methyl methacrylate (MMA) is used as liquid composition. In a glass recipient containing 99 g of MMA at 25° C. is added 1 g of the respective powder. The mixture is observed after 60 s if the powder is dispersed or not, without stirring.

Apparent Density

The norm ISO 60:1977 is used. The sample is pured through a specified funnel into a measuring cylinder of 100 cubic centimeter capacity, the excess is removed with a straightedge and the mass of the contents is determined by weighing.

Viscosity

The viscosity can be easily measured with a Rheometer or viscosimeter. The dynamic viscosity is measured at 25° C. If the liquid has a Newtonian behaviour, meaning no shear thinning, the dynamic viscosity is independent of the shearing in a rheometer or the speed of the mobile in a viscometer. If the liquid composition has a non-Newtonian behaviour, meaning shear thinning, the dynamic viscosity is measured at a shear rate of 1 $s^{-1}$ at 25° C.

The invention claimed is:

1. A polymer composition (PC1) in a form of a polymer powder comprising:

a) one stage (A) comprising a polymer (A1) having a glass transition temperature of less than 10° C., b) one stage (B) comprising a polymer (B1) having a glass transition temperature of at least 60° C., and c) a polymer (C1) having a glass transition temperature of at least 30° C., said polymer (C1) represents at most 40 wt % of the composition based on a), b) and c) only, wherein at least the component a) and the component b) of polymer composition (PC1) are part of a multistage polymer (MP1), wherein the polymer (C1) has a mass average molecular weight Mw between 10,000 g/mol and 500,000 g/mol and wherein the polymer composition (PC1) in the form of a polymer powder has a total intruded volume of at least 1.2 ml/g and at most 10 ml/g as measured by mercury porosimetry and has a cumulative intrusion for a pore size above 10 μm of at least 0.9 ml/g and an incremental intrusion between a pore size from 1 μm to 0.1 μm is at least 0.05 ml/g.

2. The polymeric composition according to claim 1, wherein the total intruded volume is at least 1.35 ml/g and at most 10 ml/g as measured by mercury porosimetry.

3. The polymeric composition (PC1) according to claim 1 wherein a relative incremental intrusion of the polymer powder for a pore size above 10 μm is at most 85%.

4. The polymer composition (PC1) according to claim 1 wherein an incremental intrusion of the polymer powder between a pore size from 10 μm to 1 μm is at least 0.1 ml/g.

5. The polymer composition (PC1) according to claim 1 wherein an incremental intrusion of the polymer powder between a pore size from 10 μm to 0.1 μm is at least 0.15 ml/g.

6. The polymeric composition according to claim 1 wherein a relative incremental intrusion between a pore size from 10 μm to 1 μm is at least 5%.

7. The polymer composition (PC1) according to claim 1 wherein the polymer powder has a volume median particle size D50 between 1 μm and 700 μm.

8. The polymer composition (PC1) according to claim 1 wherein an apparent bulk density of the polymer powder is between 0.1 g/cm$^3$ and 0.60 g/cm$^3$.

9. The polymer composition according to claim 1 wherein the polymer composition (PC1) in form of a polymer powder comprising polymeric particles PAR that make up at least 50 wt % of the polymer composition (PC1) in form of a polymer powder composition.

10. The polymer composition according to claim 9 wherein the polymeric particles PAR have a weight average particle size between 15 nm and 900 nm.

11. The polymer composition according to claim 1 wherein the stage (A) is the first stage and stage (B) comprising polymer (B1) is grafted on stage (A) comprising polymer (A1).

12. The polymer composition according to claim 1 wherein the polymers (B1) and (C1) are acrylic or (meth) acrylic polymers.

13. The polymer composition according to claim 1 wherein the polymer (A1) comprises butadiene as monomer.

14. The polymer composition according to claim 1 wherein the polymers (A1), (B1) and (C1) are acrylic or (meth)acrylic polymers.

15. The polymer composition according to claim 14 wherein at least 80 wt % of the acrylic or methacrylic monomers of the polymers (A1), (B1) or (C1) are chosen from methyl acrylate, propyl acrylate, isopropyl acrylate, butyl acrylate, tert-butyl acrylate, methyl methacrylate, ethyl methacrylate, butyl methacrylate and mixtures thereof.

16. A process for manufacturing the polymer composition according to claim 1 comprising the steps of:

a) polymerizing by emulsion polymerization of a monomer or monomer mixture (Am) to obtain one layer in stage (A) comprising polymer (A1) having a glass transition temperature of less than 10° C., b) polymerizing by emulsion polymerization of a monomer or monomer mixture (Bm) to obtain layer in stage (B) comprising a polymer (B1) having a glass transition temperature of at least 60° C.

c) polymerizing by emulsion polymerization of a monomer or monomer mixture (Cm) to obtain a layer in stage (C) comprising a polymer (C1) having a glass transition temperature of at least 30° C., and d) coagulating the layers obtained in steps a) to c).

17. A process for manufacturing the polymer composition (PC1) according to claim 1 comprising the steps of:

a) polymerizing by emulsion polymerization of a monomer or monomer mixture (Am) to obtain one layer in stage (A) comprising polymer (A1) having a glass transition temperature of less than 10° C., b) polymerizing by emulsion polymerization of a monomer or monomer mixture (Bm) to obtain layer in stage (B) comprising a polymer (B1) having a glass transition temperature of at least 60° C., both together steps a) and b) giving a multistage polymer (MP1), and c) blending multistage polymer (MP1) with a polymer (C1) having a glass transition temperature of at least 30° C.

18. The process according to claim 16 wherein step a) is made before step b).

19. The process according to claim 16 wherein the step b) is performed in presence of the polymer (A1) obtained in step a).

20. The process according to claim 16 wherein steps a), b), c) and d) are performed in that order.

21. The process according to claim 16 where a solid content before starting the coagulating is below 35 wt %.

22. The process according to claim 16 wherein a solid content before starting the coagulating is below 32 wt %.

23. The process according to claim 16 wherein in the step d) a solid content before starting the coagulating is between 5 wt % and 35 wt %.

24. The process according to claim 16 wherein in the step d) a solid content before starting the coagulating is between 20 wt % and 35 wt %.

25. The process according to claim 16 wherein in the step d) a solid content before starting the coagulating is between 5 wt % and 20 wt %.

26. The process according to claim 16 wherein in the step d) a solid content before starting the coagulating is between 10 wt % and 25 wt %.

27. The process according to claim 16 wherein in the step d) a solid content before starting the coagulating is between 15 wt % and 27 wt %.

28. The process according to claim 16 wherein in the step d) coagulating is made with a salt or an inorganic acid.

29. The process according to claim 16 wherein the process comprises additionally a drying step e).

30. A process to reduce the dispersing time of a polymer powder in a liquid composition, the process comprising adding the polymeric composition (PC1) according to claim 1 to said liquid composition, and wherein the liquid composition comprises a precursor for a thermosetting polymer or a monomer of a thermoplastic polymer.

31. The process according to claim 30, wherein the process comprises the steps of:

providing a precursor for a thermosetting polymer or a monomer of a thermoplastic polymer, and bringing into contact the polymeric composition (PC1) and said precursor.

* * * * *